United States Patent
Glaser

(10) Patent No.: US 9,415,372 B2
(45) Date of Patent: Aug. 16, 2016

(54) METHOD FOR PRODUCING A FIBER

(75) Inventor: Josef Glaser, Helfenberg (AT)

(73) Assignee: HELFENBERGER IMMOBILIEN LLC & CO TEXTILFORSCHUNGS—UND ENTWICKLUNGS KG, Helfenberg (AT)

( * ) Notice: Subject to any disclaimer, the term of this patent is extended or adjusted under 35 U.S.C. 154(b) by 837 days.

(21) Appl. No.: 13/579,829

(22) PCT Filed: Feb. 18, 2011
(Under 37 CFR 1.47)

(86) PCT No.: PCT/AT2011/000085
§ 371 (c)(1),
(2), (4) Date: Jan. 29, 2013

(87) PCT Pub. No.: WO2011/100777
PCT Pub. Date: Aug. 25, 2011

(65) Prior Publication Data
US 2013/0244871 A1 Sep. 19, 2013

(30) Foreign Application Priority Data
Feb. 18, 2010 (AT) .................................. A 251/2010

(51) Int. Cl.
*D01D 1/02* (2006.01)
*D01D 5/06* (2006.01)
(Continued)

(52) U.S. Cl.
CPC ............ *B01J 20/28023* (2013.01); *B01J 20/30* (2013.01); *B01J 20/305* (2013.01);
(Continued)

(58) Field of Classification Search
CPC .................. B29K 2105/0041; B29K 2291/00; B29K 2305/14; B29K 2307/04; B29K 2307/045; B29K 2309/02; B29K 2309/14; B29K 2491/00; B29K 2505/14; B29K 2507/04; B29K 2507/14; B29K 2509/02; B29K 2509/14; D01D 1/02; D01D 5/06; D01D 7/00; D01D 10/06; D01F 1/00; D01F 1/02; D01F 1/09; D01F 1/10; D01F 2/02; D01F 2/24; D01F 2/28; D01F 2/30; D01F 11/02; D06M 11/55; D06M 13/188
USPC .......... 264/178 F, 178 R, 183, 184, 187, 204, 264/207, 211, 211.12, 211.14, 211.15, 264/211.16, 211.17, 344

See application file for complete search history.

(56) References Cited

U.S. PATENT DOCUMENTS

| | | | |
|---|---|---|---|
| 2,650,168 A | | 8/1953 | Van Dijk et al. |
| 4,107,384 A | * | 8/1978 | Musha et al. ............. 264/344 X |

(Continued)

FOREIGN PATENT DOCUMENTS

| | | |
|---|---|---|
| AT | 502743 | 5/2007 |
| AT | 505730 | 3/2009 |

(Continued)

OTHER PUBLICATIONS

Wendler et al, "Thermostability of Lyocell Dopes Modified with Surface-Active Additives", pp. 826-828, Table 1.*

(Continued)

*Primary Examiner* — Leo B Tentoni
(74) *Attorney, Agent, or Firm* — Young & Thompson

(57) ABSTRACT

A mixture for producing a fiber or a molded part contains at least one polymer solution, in particular a cellulose solution, and an adsorbing agent. The mixture includes a removable resisting agent for the adsorbing agent. The polymer solution also can be used as a resisting agent. In order to produce a fiber or a molded part, an adsorbing agent is mixed with a polymer solution, in particular a cellulose solution, where a removable resisting agent is applied to the adsorbing agent before or during the mixing process and wherein the resisting agent is removed after the fiber has been spun or after the molded part has been molded. Alternatively or in addition thereto, a method for producing a fiber or a molded part, an adsorbing agent, in particular activated charcoal, is mixed with a polymer solution, in particular a cellulose solution.

14 Claims, 1 Drawing Sheet

(51) Int. Cl.
*D01D 7/00* (2006.01)
*D01D 10/06* (2006.01)
*D01F 1/02* (2006.01)
*D01F 1/09* (2006.01)
*D01F 2/02* (2006.01)
*D01F 2/24* (2006.01)
*D01F 2/30* (2006.01)
*D01F 11/02* (2006.01)
*D06M 11/55* (2006.01)
*B01J 20/28* (2006.01)
*D06M 13/188* (2006.01)
*C08B 3/06* (2006.01)
*C08B 3/20* (2006.01)
*C08L 1/02* (2006.01)
*D01F 1/10* (2006.01)
*D01F 2/00* (2006.01)
*D01F 2/28* (2006.01)
*B01J 20/30* (2006.01)
*C08K 3/04* (2006.01)
*C08K 5/01* (2006.01)

(52) U.S. Cl.
CPC .............. *B01J20/3078* (2013.01); *C08B 3/06* (2013.01); *C08B 3/20* (2013.01); *C08L 1/02* (2013.01); *D01F 1/10* (2013.01); *D01F 2/00* (2013.01); *D01F 2/28* (2013.01); *D06M 13/188* (2013.01); *C08K 3/04* (2013.01); *C08K 5/01* (2013.01)

(56) References Cited

U.S. PATENT DOCUMENTS

| | | | |
|---|---|---|---|
| 5,690,126 | A * | 11/1997 | Matsumura et al. .......... 131/343 |
| 6,541,627 | B1 | 4/2003 | Ono et al. |
| 9,119,420 | B2 * | 9/2015 | Sebastian |
| 2004/0018359 | A1 * | 1/2004 | Haggquist ................ 428/402.21 |
| 2008/0233821 | A1 | 9/2008 | Ruf et al. |
| 2011/0040029 | A1 | 2/2011 | Glaser |
| 2012/0024304 | A1 * | 2/2012 | Sebastian ..................... 131/332 |

FOREIGN PATENT DOCUMENTS

| | | |
|---|---|---|
| DE | 825450 | 12/1951 |
| DE | 10053359 | 5/2002 |
| DE | 69839096 | 1/2009 |
| GB | 516144 | 12/1939 |
| JP | 08325942 A * | 12/1996 |
| WO | 2005/007946 | 1/2005 |
| WO | 2009/021259 | 2/2009 |
| WO | 2009/036480 | 3/2009 |

OTHER PUBLICATIONS

Wendler et al, "Thermostabilyt of Lyocell Dopes Modified with Surface-Active Additives", Macromolecular Materials and Engineering, pp. 826-828, Table 1 (2005).*
International Search Report dated May 18, 2011, in corresponding PCT application.
Official Action dated Nov. 10, 2010, in corresponding Austrian Priority application A 251/2010.

* cited by examiner

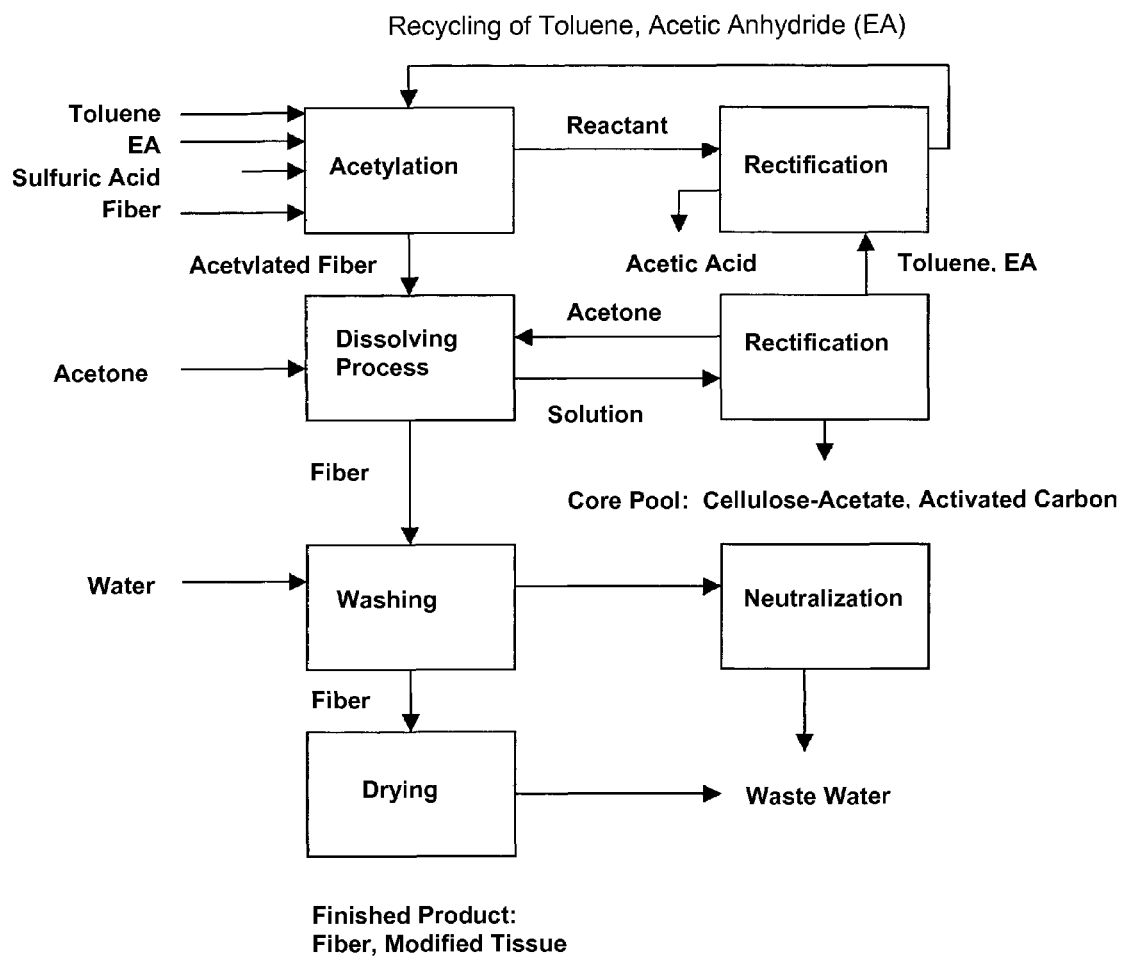

METHOD FOR PRODUCING A FIBER

BACKGROUND OF THE INVENTION

1. Field of the Invention

The invention relates to a mixture for producing a fiber or a molded part, which contains at least one polymer solution, in particular a cellulose solution, and an adsorption agent.

In addition, the invention relates to the use of such a mixture for producing a fiber or a molded part.

2. Description of the Related Art

Moreover, the invention relates to a method for producing a fiber, in which an adsorption agent is mixed with a polymer solution, in particular a cellulose solution.

Adsorption agents are generally porous materials, which because of their large surface area bind molecules to themselves by physical forces. A known adsorption agent is, for example, activated carbon, which has a highly porous structure.

It is known to use textile sheet materials made of fibers, in which at least the surface layer has activated carbon, as protective textiles because of the adsorption property of the activated carbon. In this case, the quality of the fiber depends decisively on how much of the porous structure of the activated carbon can be used. The higher the free surface of the activated carbon is on the fiber surface, the better the adsorption properties of the fiber overall. In the production of such fibers from a spinning solution, it is disadvantageous, however, that a considerable part of the surface of the activated carbon is "clogged" when the fiber is spun, so that only a relatively small part of the porous structure of the activated carbon can be used in the finished fiber.

SUMMARY OF THE INVENTION

The object of the invention is to make available a mixture, a use, as well as a method of the above-mentioned type, with which the adsorption properties of fibers or molded parts are improved.

According to the invention, it is provided that the mixture for producing a fiber or a molded part has a removable reserving agent for the adsorption agent. In addition, it is provided according to the invention that an adsorption agent with a removable reserving agent is reserved and that a reserving agent is removed after the fiber is spun or the molded part is molded, i.e., removed from the surface of at least a part of the adsorption agent. The surface of the adsorption agent on the surface of the finished fiber and optionally at least partially over the cross-section of the fiber is thus released again, meaning that the porous structure of the adsorption agent in the fiber can be used almost completely. Laboratory tests have shown that the usable surface area of the activated carbon with a conventional fiber is 15.17 $m^2/g$; conversely, according to the invention, the usable surface area of the activated carbon is approximately 339.85 $m^2/g$, i.e., more than 22 times as much.

The surface of the adsorption agent, in particular the activated carbon, can be defined within the scope of the invention not only as the outward-pointing surface of the adsorption agent but also as the inner surface of the porous structure.

"Reserving agents" are defined as agents that temporarily "clog" the surface or the porous structure of the adsorption agent and that can be removed again from the adsorption agent, can be removed in particular after the fiber is spun/after the molded part is molded, do not negatively affect the composition of the adsorption agent, and do not saturate the adsorption properties of the adsorption agent after the removal. "Reserving" is defined as a deliberate, temporary clogging or saturation of the surface of the adsorption agent, so that as long as it is reserved, the adsorption agent does not take up any other substances. "Reserved or unreserved adsorption agent" is defined as the state of the adsorption agent, in which the adsorption agent is temporarily "clogged" by a reserving agent or is not "clogged" by a reserving agent.

As a reserving agent, for example, solid or liquid paraffin can be used. Other substances from the group of alcohols or quite general substances that do not negatively affect the composition of the spinning solution and do not negatively alter the spinning solution in its properties can also be used, however.

Preferably, after the fiber is spun or the molded part is molded, the reserving agent can be dissolved by heat or by a solvent. As solvents, for example, ionic liquids, N-methylmorpholines or N-oxides can be used.

Within the scope of the invention, activated carbon, diamond, gold, silver, ceramic, carbon black, stone dust and/or mixtures that consist of two or more of these components can be used.

Within the scope of the invention, the polymer solution can be mixed with a crack initiator or the finished fiber/finished molded part can be brought into contact with a crack initiator. Crack initiators are defined as substances that form fine cracks in the fiber/molded part without the fiber or the molded part being decisively adversely affected thereby. As crack initiators, for example, sulfuric acid, dry sulfur, and sulfur ice can be considered. The removability of the reserving agent is thus possible not only from the surface of the finish-spun fiber or the finished molded part. Through these fine cracks, the reserving agent can in practice be removed over a large part of the cross-section of the fiber.

BRIEF DESCRIPTION OF THE DRAWING FIGURE

FIG. 1 is an example of the process flow of the present invention.

DETAILED DESCRIPTION OF THE INVENTION

A first embodiment of the invention is depicted as follows in the example of the production of a fiber:

The reserving agent is mixed with the adsorption agent, for example activated carbon, before the adsorption agent is mixed with the polymer solution, in particular a cellulose solution. As a reserving agent, gaseous, solid or liquid agents can be used, for example nitrogen or paraffin, which can be removed again from the adsorption agent, do not negatively affect the composition of the adsorption agent, and do not saturate the adsorption properties of the adsorption agent. After the reserved activated carbon is mixed with the cellulose solution and optionally with additives, such as, for example, a finish and/or graphite, the fiber can be produced from the mixture with the method that is already known. The reserving agent is then removed from the surface of the adsorption agent of the finished fiber, for example dissolved by a solvent and then washed off.

Paraffin has the property of greatly expanding when being heated. If paraffin is used as a liquid or solid reserving agent, the latter is first mixed with the activated carbon to deliberately temporarily clog the surface or the porous structure of the activated carbon, i.e., to temporarily saturate it so that the activated carbon cannot be saturated by any other substance when being mixed with the cellulose solution. After the activated carbon that is reserved with paraffin is mixed with the cellulose solution, a fiber can be spun. When the finished fiber is heated, the paraffin expands in such a way that it dissolves on the fiber surface and partially via the cross-section of the fiber from the surface of the activated carbon as well as from the porous structure of the activated carbon. Subsequently, the paraffin that is dissolved by heat from the activated carbon can then be dissolved with a fat-dissolving solvent, and this solution can then be washed off of the fiber.

Before mixing with cellulose solution, activated carbon can also be reserved with nitrogen as a reserving agent, i.e., activated carbon can be saturated so that it no longer takes up any other substances. Then, the activated carbon can be mixed with the cellulose solution, and a fiber can be spun. When the fiber is then put under, e.g., pressure or vacuum, the nitrogen then volatilizes, and the surface of the activated carbon is again released on the fiber surface and partially over the cross-section of the fiber.

A second embodiment of the invention is also depicted by way of example below in the example of the production of a fiber:

The unreserved adsorption agent, for example activated carbon, is mixed directly with the polymer solution, in particular a cellulose solution, whereby a part of the polymer solution is used as a reserving agent, and this part of the polymer solution is dissolved by a low-molecular solvent after the fiber is spun or the molded part is molded. After the adsorption agent is mixed with the polymer solution as a reserving agent and optionally with additives, such as, for example, organic and/or inorganic lubricating agents, the fiber can be produced from the mixture with the already known method. In this embodiment, it is further provided that at least one portion of the polymer that is used as a reserving agent is acetylated after the fiber is spun or the molded part is molded and that the acetylated polymer, in particular the acetylated cellulose, and the solvent are washed off of the fiber (similar to that with the molded part).

As an alternative or in addition to reserving the adsorption agent, the invention also relates to a method for producing a fiber or a molded part, in which an adsorption agent, in particular activated carbon, is mixed with a polymer solution, in particular a cellulose solution, which method is characterized in that polymer is acetylated after the fiber is spun or the molded part is molded. By the acetylation of the surface of the cellulose fiber, which preferably has activated carbon and optionally graphite, and subsequent dissolving of the cellulose acetate that is produced, the usable surface area of the activated carbon is significantly increased. The surface of the cellulose fiber is also defined as the surface that exists within optionally induced cracks.

The acetylated cellulose can be dissolved from the fiber/molded part, dissolved in particular by a solvent. The fiber/molded part can be washed and dried in an additional step.

The acetylation of the cellulose as a polymer in a finished fiber or a finished molded part is depicted by way of example in the FIGURE, whereby the fiber or the molded part can be produced either with a known method or, if a reserving agent is used, except for reserving of the adsorption agent, with an otherwise known method.

The acetylation of the cellulose as a polymer can be achieved, for example, as follows:

The surface of the fiber or a molded part, which has, for example, 30 to 50% activated carbon relative to the cellulose mass, which can be produced with a known method or, except for the reserving of the adsorption agent, with an otherwise known method, is treated with, i.e., brought into contact with, a reaction solution that contains 100 ml of absolute toluene, 50 ml of acetic anhydride, and 0.1 ml of sulfuric acid ($H_2SO_4$) as a catalyst and crack initiator. The ratio of fiber or molded part to the reaction solution can be determined in that the fiber or the molded part is completely covered with the reaction solution. As an alternative or in addition to the acetic anhydride, for example, isopropenyl acetate can be used. By the acetylation, the part of the cellulose that is in the porous structure of the adsorption agent is brought into a soluble form (cellulose acetate).

Within the scope of the invention, either a reaction mixture in stoichiometric excess can be added to the fiber or the molded part for acetylation, i.e., more reaction solution is used than would be necessary for acetylation of a desired proportion of cellulose. In this case, the reaction can then be stopped by dissolving cellulose acetate and washing the fiber or the molded part. As an alternative to this, within the scope of the invention, only exactly the amount of reaction solution can be used that is necessary for acetylation of a predetermined amount of cellulose, whereby the acetylation is then automatically stopped.

Fine cracks in the fiber are produced by sulfuric acid, without the fiber being adversely affected. Thus, cellulose can be acetylated not only on the periphery of the fiber, but an acetylation of the cellulose is also possible by a large part of the cross-section of the fiber.

The acetylated, soluble cellulose is then dissolved and washed off according to the method below:

Addition of 150 ml of dichloromethane+15 ml of methanol
4 hours of stirring (cold)
Addition of 150 ml of dichloromethane+15 ml of methanol
24 hours of stirring (cold)
Addition of 150 ml of dichloromethane+15 ml of methanol
24 hours of stirring (cold)

As an alternative or in addition to the dichloromethane-methanol mixture, acetone can also be used as a solvent for the acetylated cellulose. The agents that are used for acetylation of the cellulose and/or for dissolving the cellulose acetate can be recovered after their use, for example recovered by a separating method. Possible cellulose acetate and activated carbon wastes can be discarded.

The thus produced fiber is washed in one additional step with, for example, water; i.e., the solvent and the dissolved or not-yet-dissolved cellulose acetate are washed off of the fiber and dried in an additional step.

The usable surface of the activated carbon that is used in these laboratory tests as an adsorption agent is increased relative to an adsorption agent without reserving or relative to a fiber/molded part, in which the cellulose was not acetylated, by more than 22 times as much.

Within the scope of the invention, known methods for producing fibers can be used by the mixture being produced as described above and this mixture then being spun, or a main stream that consists of essentially pure polymer solution and a separate partial stream that consists of polymer solution and mixture being produced, and these two streams, separated at first, then being spun together.

In addition, the mixture according to the invention can be used in a spinning method and a method for yarn production and a thread-winding method that are known in the art, such as, e.g., in DREF methods or CORE methods. With the mixture according to the invention or the use thereof, it is possible to create yarns with specific core (central core)/jacket structures. In this connection, the core/center core (e.g., aramides or aromatic polyamides), which can be selected depending on the desired property, is thread-wound with the fiber according to the invention. Thus, the properties of the core/central core and fiber, such as, e.g., adsorbability, tensile strength, and heat resistance, can advantageously be combined with one another. Also, the mixture according to the invention can be used in the melt-blow method, for example for producing fiber fleece, and/or electro-spinning method.

The invention can be used in a lyocell method that is known in the art (N-methylmorpholines, N-oxides, NMMNO) for producing a fiber as well as in the wet-spinning method.

By the lyocell method, the fiber can obtain a core-shell structure. With this core-shell structure, it can occur that the thin shell has a smaller proportion of activated carbon than the core. By the acetylation of the cellulose according to the invention, the shell can be dissolved at least partially by acetylation after the fiber is spun, by which a significantly stronger-adsorbing fiber is incorporated.

The fibers or molded parts according to the invention can be further processed, i.e., in the form of textile sheet materials, such as, e.g., knit fabric, fibrous web, fiber fleece, or the like, for their use, for example, as protective clothing or athletic clothing, or in the form of films.

In summary, an embodiment of the invention can be depicted as follows:

A mixture for producing a fiber or a molded part, which contains at least one polymer solution, in particular a cellulose solution, and an adsorption agent, has a removable reserving agent for the adsorption agent. Also, the polymer solution can be used as a reserving agent. For the production of a fiber or a molded part, an adsorption agent is mixed with a polymer solution, in particular a cellulose solution, whereby the adsorption agent is reserved before or during this with a removable reserving agent and whereby the reserving agent is removed after the fiber is spun or the molded part is molded.

As an alternative or in addition thereto, the invention relates to a method for producing a fiber or a molded part, in which an adsorption agent, in particular activated carbon, is mixed with a polymer solution, in particular a cellulose solution, characterized in that polymer is acetylated after the fiber is spun or the molded part is molded.

The invention claimed is:

1. A method for producing a fiber or a molded part for clothing, comprising:
   providing a mixture which contains a cellulose solution, and an adsorption agent, having a removable reserving agent for the adsorption agent,
   wherein the cellulose solution, is the removable reserving agent for the adsorption agent, and cellulose is acetylated.

2. A method for producing a fiber or a molded part for clothing, comprising:
   mixing an adsorption agent with a removable reserving agent;
   mixing the adsorption agent with a cellulose solution;
   spinning the fiber or molding the molded part;
   reserving the adsorption agent with the removable reserving agent, where after the fiber is spun or the molded part is molded, the reserving agent is dissolved by heat, or dissolved by a solvent or dissolved under pressure or in a vacuum;
   removing the reserving agent;
   mixing unreserved adsorption agent with the cellulose solution; and
   processing the fiber or molded part into clothing,
   wherein as the reserving agent, a part of the cellulose solution, is incorporated into the adsorption agent and after the fiber is spun or the molded part is molded, cellulose that is used as a reserving agent is acetylated.

3. The method according to claim 2, wherein polymer of the fiber/molded part is brought into contact with a crack initiator, or sulfuric acid.

4. The method according to claim 2, wherein the reserving agent is mixed with the adsorption agent before the adsorption agent is mixed with the polymer solution.

5. The method according to claim 2, wherein cellulose is acetylated by adding toluene and acetic anhydride.

6. The method according to claim 2, wherein cellulose acetate is dissolved by a solvent, or acetone, and/or a mixture that comprises dichloromethane and methanol.

7. The method according to claim 6, wherein the acetylated cellulose and the solvent are washed off of the fiber or the molded part.

8. The method according to claim 2, wherein as an adsorption agent, activated carbon, diamond, gold, silver, ceramic, carbon black, stone dust and/or mixtures that consist of two or more of these components are used.

9. A method for producing a fiber or a molded part for clothing, comprising:
   mixing an adsorption agent, or activated carbon, with a cellulose solution, wherein after the fiber is spun or the molded part is molded, cellulose is acetylated.

10. The method according to claim 9, wherein cellulose for acetylation is brought into contact with toluene and/or acetic anhydride and/or isopropenyl acetate.

11. The method according to claim 9, wherein polymer is brought into contact with a crack initiator.

12. The method according to claim 9, wherein acetylated polymer is dissolved.

13. The method according to claim 12, wherein acetylated polymer is dissolved by a solvent, or acetone, or a mixture of dichloromethane and methanol.

14. The method according to claim 9, wherein the fiber is washed and optionally dried.

* * * * *